(12) United States Patent
Chen

(10) Patent No.: US 6,563,835 B1
(45) Date of Patent: May 13, 2003

(54) CALL PROCESSING ARRANGEMENT FOR ATM SWITCHES

(75) Inventor: Xiaoqiang Chen, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/251,903

(22) Filed: Feb. 19, 1999

Related U.S. Application Data

(60) Provisional application No. 60/075,295, filed on Feb. 20, 1998.

(51) Int. Cl.[7] .............................................. H04L 12/28
(52) U.S. Cl. ....................................... 370/410; 370/395
(58) Field of Search ................................ 370/230, 235, 370/352, 356, 359, 360, 389, 395, 396, 428, 410

(56) References Cited

U.S. PATENT DOCUMENTS 6,212,164 B1 * 4/2001 Murakami et al. .......... 370/230

* cited by examiner

Primary Examiner—Wellington Chin
Assistant Examiner—Brenda Pham

(57) ABSTRACT

A connection oriented switch, for example, an ATM switch, achieves scalable performance and enhanced reliability through a call processing architecture in which call processing functions are distributed to each network interface module rather than centralized in a call control module. Each network interface module has its own dedicated processor module that performs certain call processing tasks to off-load the processing burden from the call control module. Depending on the degree of processing power distribution, three embodiments include a distributed signaling architecture, a distributed call control architecture, and a distributed routing architecture.

7 Claims, 16 Drawing Sheets

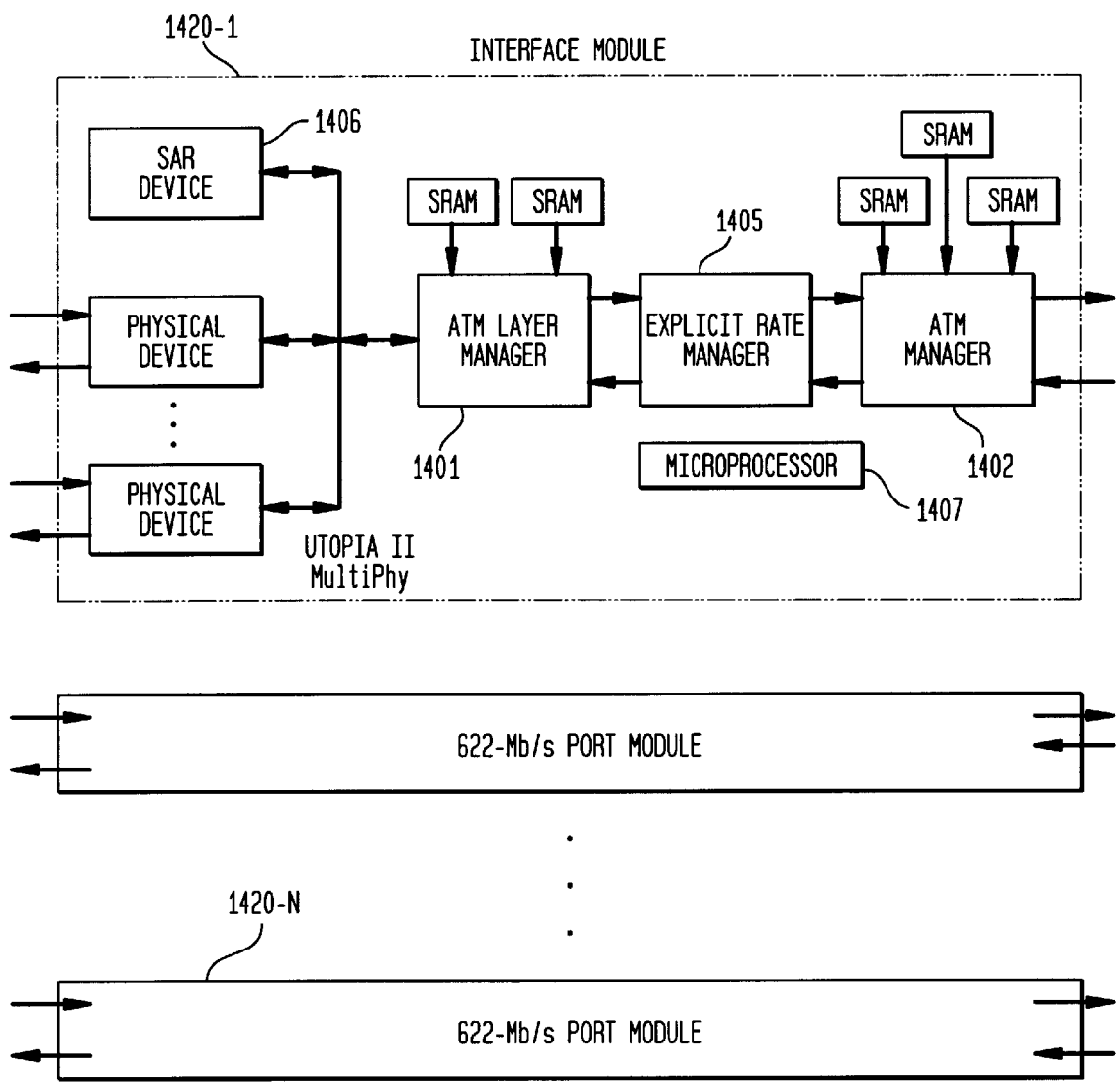

CALL PROCESSING ARRANGEMENT FOR ATM SWITCHES

CROSS-REFERENCE TO RELATED APPLICATION

This application claims priority of Provisional Application Serial No. 60/075,295 which was filed Feb. 20, 1998.

TECHNICAL FIELD

The present invention relates generally to Asynchronous Transfer Mode (ATM) switches, and, more particularly, to a call processing arrangement for ATM switches in which aspects of the call processing are performed in a distributed (rather than centralized) manner.

BACKGROUND OF THE INVENTION

In any connection-oriented communications networks, a connection from the source to the destination has to be established before user data or information can be transferred on the connection. The functions performed in the switch to establish the connection are referred to in this application as "call processing". Generally, call processing in the context of this patent application refers to the procedure which a switch follows to handle call setup and release. More specifically, call processing includes the functions of signaling, call control, and call flow (path selection).

The number of calls that the switch can process per second is an important performance objective for the switch design. A switch that can handle a large number of calls per second allows the network operator to generate a significant amount of revenue given that resources are available to admit calls. With the advent of very large switch design driven by asynchronous transfer mode (ATM) technology, the demand for call processing power has increased significantly in recent years. As widely available transmission speeds have increased by more than an order of magnitude, call processing performance has not increased nearly as much. Current ATM switch implementations can typically handle 50 to 200 calls per second. This has not even reached the level of call processing capacity of today's telephone exchanges, which can handle about 400 to 500 calls per second, and is far from adequate to handle increased traffic volume evident in data networks. It has long been recognized that a major obstacle to carry transaction-oriented data traffic over ATM is call processing delay in ATM switches. A recent study on switched IP flows reported by S. Lin and N. McKeown in "A simulation study of IP switching," ACM SIGCOMM '97, indicated that switches supporting at least 10,000 virtual connections on each switch link of 45 Mbps would see acceptable performance with today's Internet traffic. However, the volume and diversity of Internet traffic is growing rapidly. It is predicted in the study that before long, more than 65,536 virtual connections per switch link would be required to provide adequate performance in the core of the Internet. When the average holding time for each data traffic flow or connection is short, this places a significantly high demand for fast connection setup and tear-down per each link. As the total switching capacity increases, switches are being built with higher port density, thus further increasing the demand for call processing capacity for the entire switch. With today's hardware and memory technology, switching fabrics with the capacity of 160 Gbps described by K. Eng and M. A. Pashan in "Advances in shared-memory designs for gigabit ATM switching," Bell Labs Technical Journal, Vol. 2, No. 2, pp. 175–187, Spring 1997, or 320 Gbps described by N. McKeown, M. Izzard, A. Mekkittikul, W. Ellersick and M. Horowitz in "The Tiny Tera: A packet switch core," IEEE Micro Magazine, January–February 1997, can be made commercially available. Thus, the growth in the switching capacity itself, as well as the increased transmission bandwidth has led the need for dramatically increasing call processing capacity. It is believed that one of the real challenges for future switch designs is to support more than 10,000 calls per second with processing latency of 100 microseconds for call establishment.

It has been widely recognized that signaling message processing can be a significant bottleneck in call processing. One of the ways to speed up call processing is therefore to reduce the time in processing signaling messages. ATM signaling protocols are transmitted using tagged message formats in which a message can be considered as a sequence of interleaved tag and data fields. The tag fields define the meaning of subsequent fields. These messages are computationally expensive to decode, partly because decoding each data field requires testing one or more tag fields. Therefore, one way to improve the performance of signaling message processing is to develop sufficient techniques to reduce the cost of encoding and decoding. A fast decoding technique that has been proposed by T. Blackwell in "Fast decoding of tagged message formats," IEEE/ACM INFOCOM '96 goes in this direction. Proposals for parallel processing as described by D. Ghosal, T. V. Lakshman and Y. Huang in "High-speed protocol processing using parallel architectures," IEEE INFOCOM '94, p. 159–166, 1994 and hardware-based decoding as described by M. Bilgic and B. Sarikaya in "Performance comparison of ASN 1 encoder/decoders using FTAM", Computer Communications, Vol. 16, No. 4, pp. 229–240, April 1993, have also been proposed in the literature. Since one of the most processor intensive tasks is the parsing of signaling messages, another way to speed up this process is the complexity reduction of signaling messages as proposed by T. Helstern in "Modification to fast SVC setup procedures," ATM Forum Contribution 97-0521, July 1997. A new architecture for lightweight signaling has been recently proposed by G. Hjalmtysson and K. K. Ramakrishnan in "UNITE—An architecture for lightweight signaling in ATM networks," to appear in INFOCOM '98, which uses a single ATM cell with proper coding to manage cell establishment possibly in hardware while performing other tasks such as quality of service (QoS) negotiation in-band.

With significant advances of hardware technology over the last fifteen years, memory speed has increased (90 times), from 450 ns to 5 ns, and CPU speed has increased (250 times) from 1 Mhz to 250 Mhz. In comparison, the transmission speed has increased (11,000 times) from 56 Kbps to 622 Mbps. It is evident that we are reaching the point where call processing power cannot be further improved only through the use of faster components and microprocessors. Other solutions are required.

SUMMARY OF THE INVENTION

In accordance with the present invention, call processing architectures for a connection oriented switch such as an ATM switch are arranged such that the switch performance is easily grown as the call traffic handled by the switch increases. This makes the design "scalable". A key element of the present invention is the distribution of call processing functionality, including some or all of the signaling, call processing and call routing (path selection) functions, to each interface module in a switch. This offloads the processing required in the centralized switch control module that is normally a bottleneck in conventional designs, and thereby overcomes the deficiencies associated with the conventional centralized call processing architecture.

In accordance with the present invention, a connection oriented switch such as an ATM switch includes a switch fabric, and a plurality of input/output or interface modules for receiving incoming calls, applying them to the switch fabric, and routing calls that were passed through the switch fabric toward their destinations. Each interface module also has its own dedicated processor that performs some or all of the call processing tasks to off-load the processing burden from a central control entity. The switch further includes a switch control module that performs call processing tasks not performed in the input/output modules. Depending on the degree of processing power distribution, three embodiments are described: distributed signaling architecture, distributed call control architecture, and distributed routing architecture.

In the distributed signaling architecture, the signaling function resides in the ingress and egress modules that are part of the interface module. The call control and routing functions are performed in a centralized manner, in the switch control module. In the distributed call control architecture, both the signaling and call control functions reside in the interface modules, and only the routing function remains in the switch control module. In the distributed routing architecture, all three of the functions, namely, signaling, call control and routing are performed in the interface modules, and the centralized switch control module provides periodic (but not call by call) topology updates that are used for routing purposes.

With the present invention, the distributed scalable call processing architecture satisfies the needs for scalable performance, high availability and flexible configuration. The architecture is scalable with respect to the number and types as well as speeds of network interface modules that can be supported. The arrangement provides high performance of handling call requests, flexible configurations, and allows a balanced distribution of processing power across the entire system. The design is robust in that it can reduce the single point of failure in a centralized implementation.

BRIEF DESCRIPTION OF THE DRAWING

The present invention will be more fully appreciated by consideration of the following detailed description, which should be read in light of the accompanying drawing in which.

DETAILED DESCRIPTION

Figure 1:
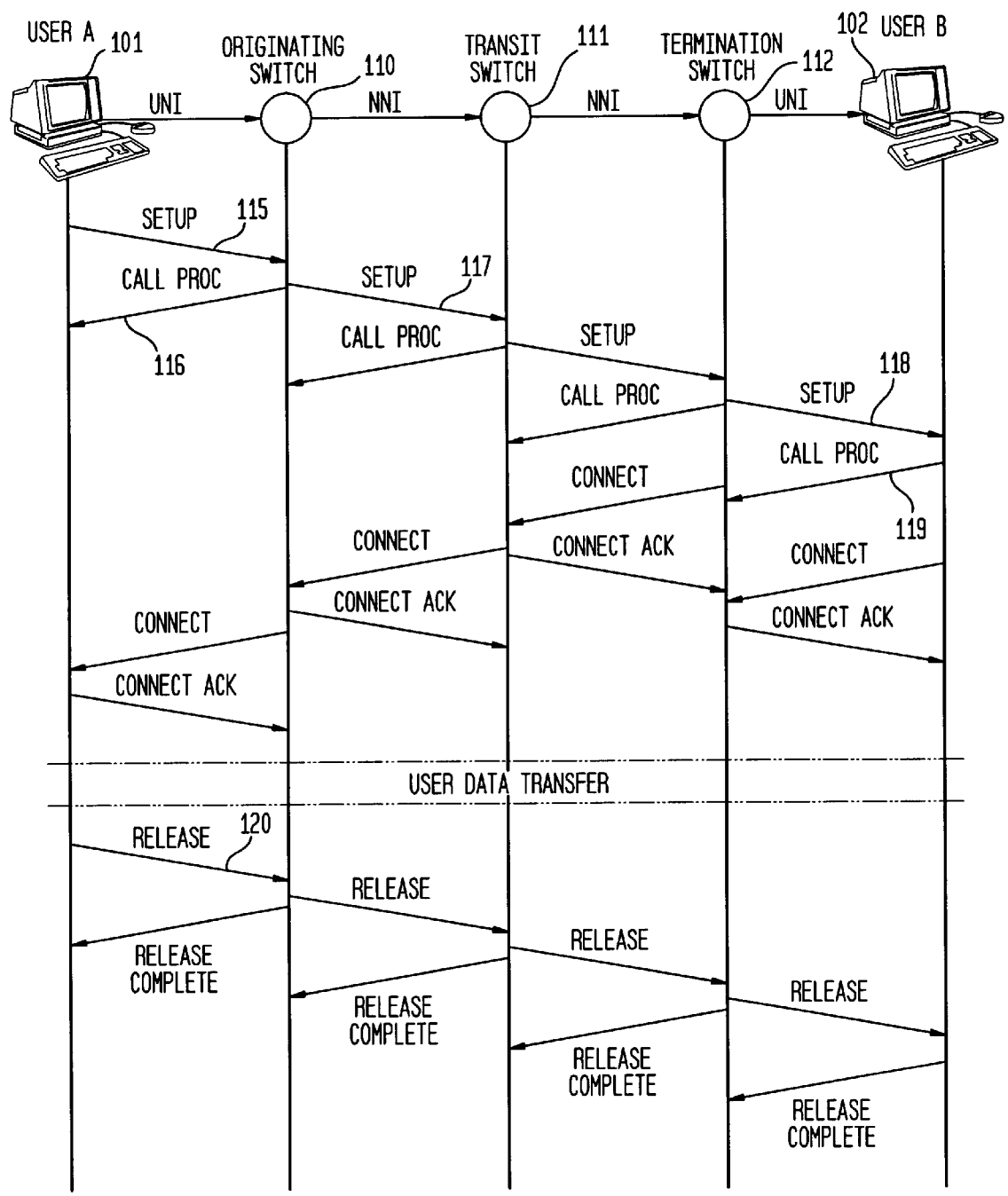
FIG. 1 is a diagram illustrating the three-phase communication procedure used in networks of conventional (prior art) switches.

Before proceeding to a description of the present invention, it will be instructive to consider certain call processing fundamentals. ATM is an example of a connection-oriented technology that relies on signaling to establish and control connections. A call model in ATM networks is a three-phase procedure: call establishment, user data transfer and call termination. A typical point-to-point call procedure is illustrated in FIG. 1. The call establishment phase begins by the user A at terminal 101 issuing a SETUP message 115. This message is sent to the originating switch 110 via a user-network interface (UNI) on an incoming link to the switch. The SETUP message contains necessary information for the switch 110 to route the call through the network, such as the calling party and called party addresses, traffic descriptors in forward and/or backward directions, and requirements for quality of service (QoS). Upon receipt of the SETUP message, the originating switch 110 returns to the calling party a CALL PROC message 116 which is used to indicate that the call has been in progress.

If the originating switch 110 determines that the called party is on another switch, then the first hop (to the next switch, which is shown in FIG. 1 as transit switch 111) on the route and the appropriate outgoing link are selected. A connection is set up between the incoming link and the outgoing link at the switch 110. A SETUP message 117 is then sent to the transit switch 111 via a network-to-network interface (NNI). This process continues until the SETUP message reaches the terminating switch 112. The terminating switch will determine the identity of the called party (at terminal 102) to be connected. If the connection is allowed, the switch 112 notifies the called party (user B) of the incoming call with a SETUP message 118 on the destination UNI interface. When the called party accepts the call, it sends a CONNECT message 119 along the reverse path all the way to the calling party. This message serves as an acknowledgement that a connection has been established. It may also contain additional information such as QoS accumulation of both directions. A User data transfer phase follows the call establishment. During this phase, actual user information (as opposed to signaling or control information) is exchanged. Following the data transfer phase, a call release procedure can be triggered at both end users by issuing a RELEASE message. In the example of FIG. 1, we show a RELEASE message 120 initiated by the calling party. The remaining details of the procedures illustrated in FIG. 1 are self-explanatory.

Figure 2:
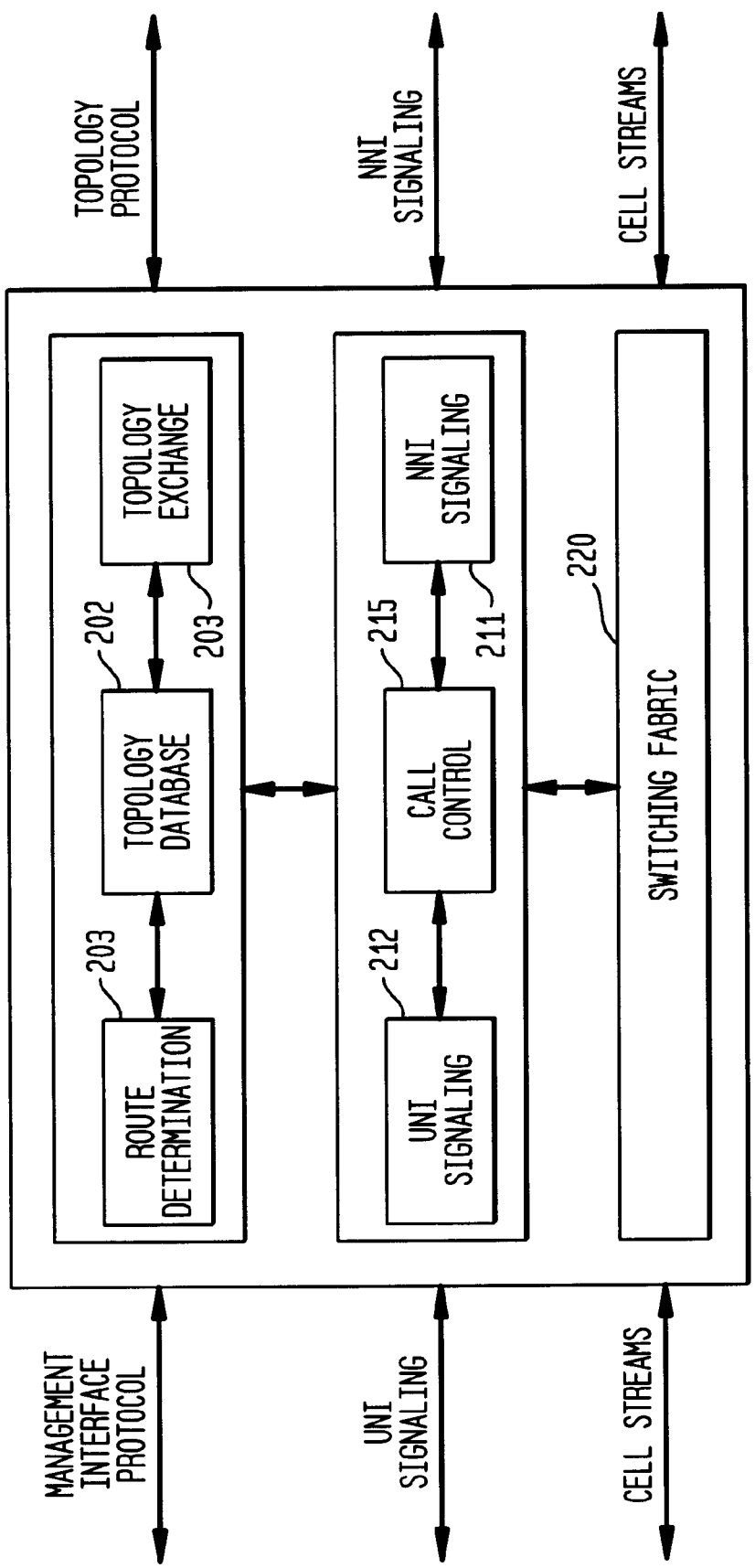
FIG. 2 is a switching system reference model.

Call processing is generally referred to the set of tasks that a switch has to perform for call establishment. The functional view of a typical switching system is shown in FIG. 2, which illustrates a prior art switching system reference model. Three processor intensive tasks of call processing are signaling, call control and routing. Each process will be discussed in turn.

Signaling

Signaling is used to establish, manage and terminate connections and described as a language which enables two peer switching systems to converse for the purpose of setting up calls. The ATM signaling system has evolved from narrow-band ISDN networks such as Q.931 to keep pace with new service offerings and advances in broadband networks. Some additional network capabilities include quality-of-service negotiation, hierarchical source routing, and multipoint connections. Various signaling protocols and standards have been proposed and/or adopted. See, for example, R. O. Onvural and R. Cherukuri, Signaling in ATM networks, Artech House, 1997, and U. D. Black, Signaling in Broadband Networks (ATM, vol. 2), Prentice Hall, 1997.

Signaling is classified into user-network interface (UNI) (shown as block 212 in FIG. 2), as specified by The ATM Forum in *User-Network Interface Specification Version* 3.0, 3.1, 4.0 and network-to-network interface (NNI) as specified by The ATM Forum in *Private Network-Network Interface Specification Version* 1.0. The major difference between UNI and NNI is that the latter needs to handle the path selection through a network of switches. There are two versions of NNI interfaces. The public NNI is defined by the ITU, which is referred to as B-ISUP, and the private NNI standardized at the ATM Forum is referred to as PNNI (private network-to-network interface), which is an extension of UNI interface. In the context of this application, the term of NNI interface, shown as block 211 in FIG. 2, is used generically to refer to the current standard of PNNI described in the last mentioned ATM Forum specification. Based on packet-switching technology, the signaling system is able to effectively provide reliable services and simplify introduction of new features and services.

Call Control

The primary function of call control, shown generally in FIG. 2 as block 215, is the coordination of connection management and the implementation of local traffic management policy across the switching system. Some of the functions performed with respect to connection management include establishing and maintaining call records, determining service category, and coordinating connection states on signaling stacks on both ingress and egress sides of connections. In a practical switching system, call control involves the design of finite state machines for both unicast and multicast connections.

For the sake of clarity, it is assumed that the call control function is also in charge of traffic management. Traffic management is defined as the set of actions taken by a switching system during the call establishment phase in order to determine whether the connection request can be accepted or should be rejected. The major function of traffic management is to implement local call admission control. When a new connection request is received at the switch, the call admission control procedure is executed to decide whether to accept or reject the call. A call is accepted if the switch has enough resources to provide the QoS requirements of the connection request without affecting the QoS provided to existing connections. The call control then programs the switching fabric to set up the connection in progress. It is worth noting that the traffic management is often vendor-specific, largely dependent on underlying switching fabric architectures.

Routing

The main function of routing is to find a path across the network between two or more switching systems. The selected path, which is implemented in the switch of FIG. 2 by determination of an appropriate path through switching fabric 220, is required to meet end-to-end service requirements of the connection. In order to achieve this, the routing system consists of three major functions as shown in FIG. 2. The topology exchange function 201 allows each switching system to advertise information about the NNI links attached to it to other switching systems, typically based on a link-state routing protocol. A switching system uses link state information to build a topology database 202 of the advertised capabilities, the reachability and the desirability of other switching systems to carry connections with different characteristics. The topology database 202 provides a logical view of the network upon which the route determination can be executed. The route determination function 203 applies a path selection algorithm to determine a path or route that satisfies performance constraints. In general, there will be more than one path in the network to choose from. The goal of the path selection algorithm is to achieve high utilization of network resources while meeting multiple service requirements of the connection.

Figure 3:
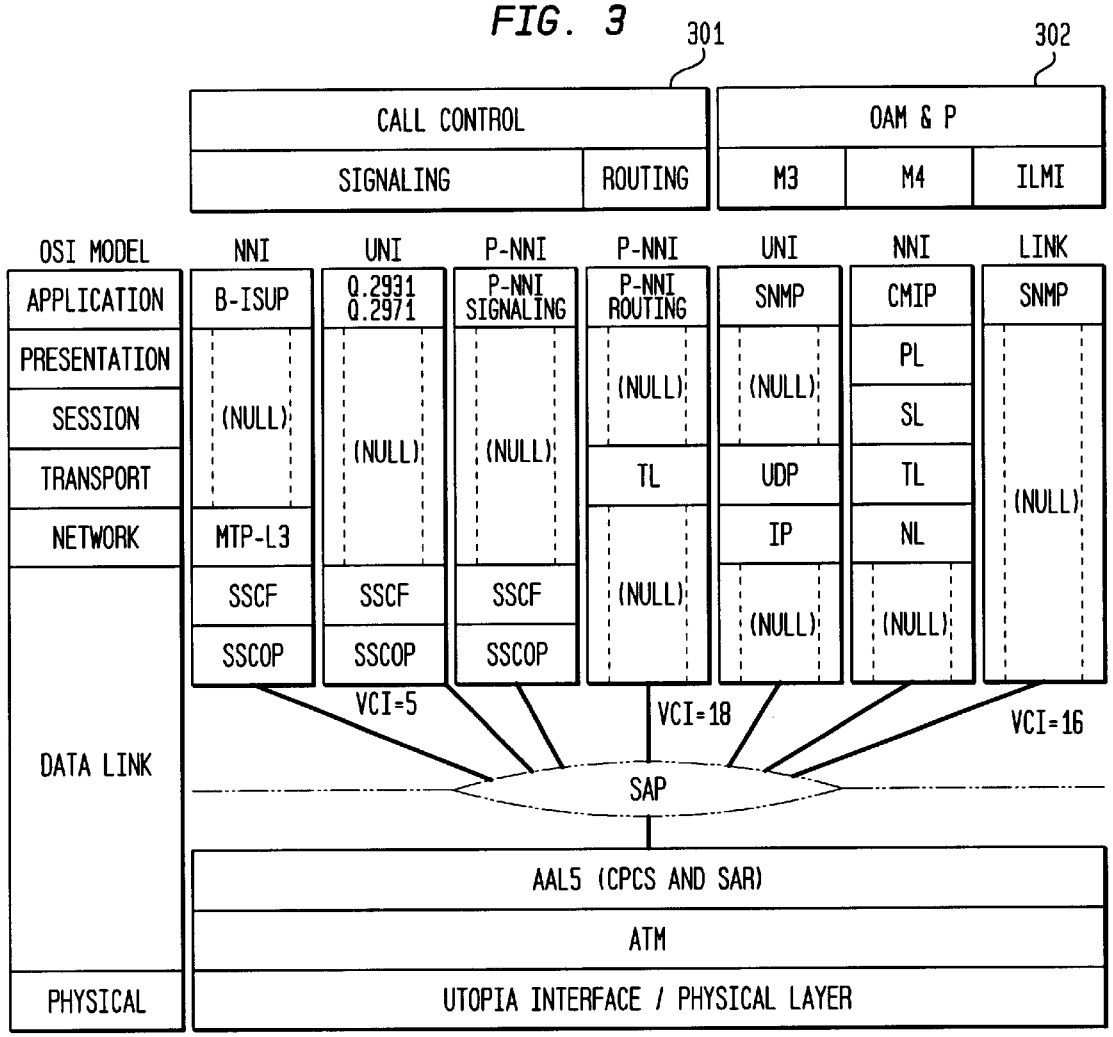
FIG. 3 is a diagram illustrating the signaling protocol stacks for both UNI and NNI signaling.

The protocol stacks at a switch are shown in FIG. 3. For the purpose of call processing, our focus is on the control plane 301, which is responsible for real-time processing involving connection establishment and termination. The management plane 302 in FIG. 3 is illustrated for completeness. This portion of the protocol stack handles the system administration, operation and network management. The signaling protocol stacks for both UNI and NNI signaling shown in FIG. 3 include AAL5 (ATM adaption layer 5), SSCOP (service-specific connection-oriented protocol), SSCF (service-specific coordination function) and the signaling entity which processes signaling messages and maintains a connection state for each active connection. Various signaling software has been commercially available in the market with improved performance and quality. Examples of information related to such software is set forth in the following websites:

Data Connection Limited at http://www.datcon.co.uk

Trillium Digital Systems at http://www.trillium.com

Inverness Inc. at http://www.invernessinc.com

Harris & Jeffries at http://www.hjinc.com

Cellware Broadband at http://www.cellware.de.

Figure 4:
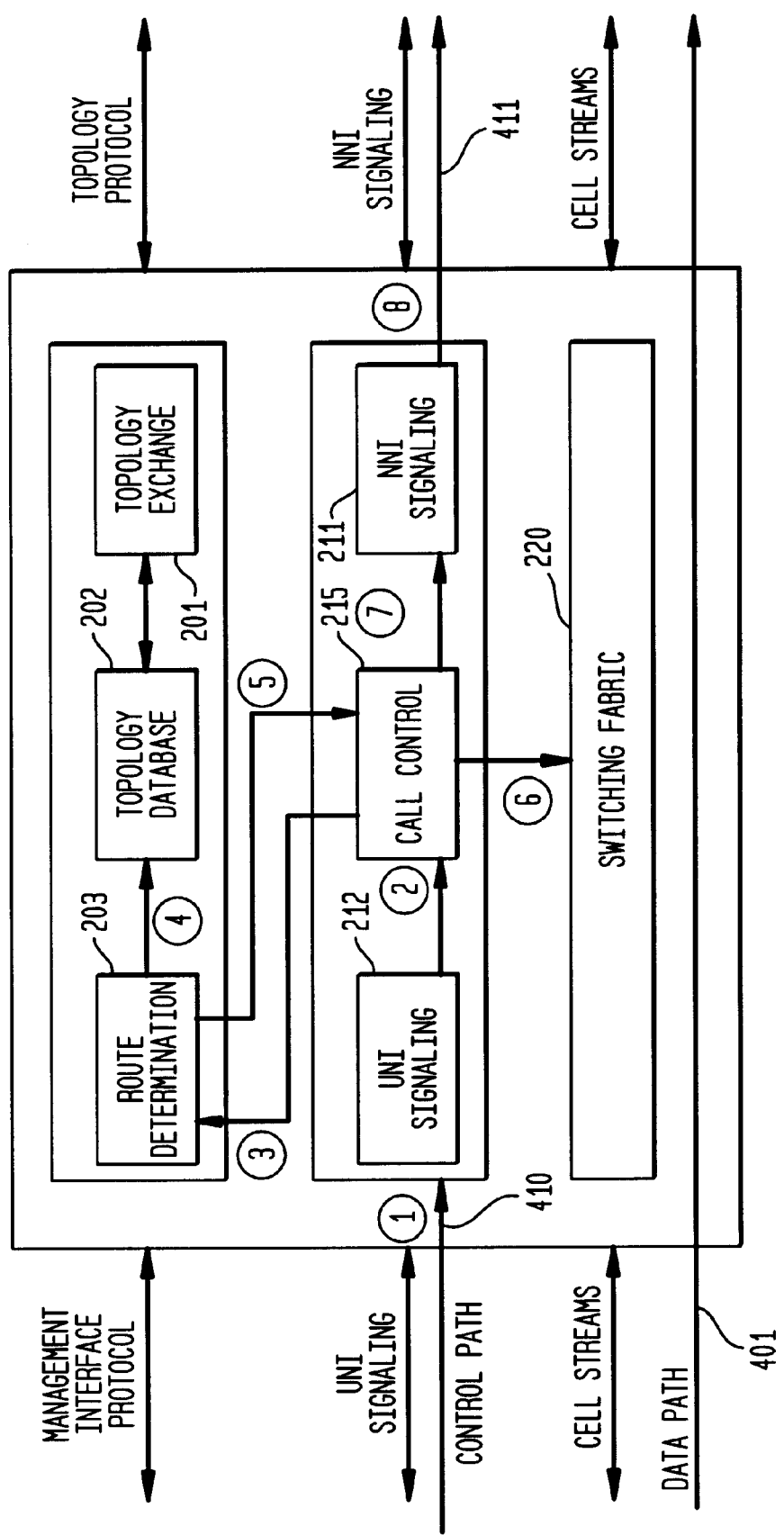
FIG. 4 is a diagram illustrating a typical sequence of events taking place at the switching system shown in FIG. 2.

A typical sequence of events taking place at a switching system is illustrated in FIG. 4. (The same reference designations are used in FIG. 4 as were used in FIG. 2). In FIG. 4, the data path is indicated by path 401, while the control path is indicted by a series of shaded arrows that begin with arrow segment 410 and end with arrow segment 411. Each of the segments of the control path corresponds to a numbered step 1 through 8 which is described in more detail below.

In step 1 in FIG. 4, when a new call request is received at the switch, it is first terminated on the signaling stack 212 associated with the ingress side. This ingress signaling involves message parsing and resource allocation. Typically, it will determine the allocation of VPI/VCI (virtual path identifier/virtual channel identifier) value for the call request on the incoming link or port. We denote the processor time that takes to perform this task as $T_i$.

In step 2 in FIG. 4, the ingress signaling 212 forwards the request to the call control 215 via the internally defined interface. Additional information is needed to indicate the incoming link that the call arrived and the connection identifier that the call control can use to uniquely identify the call system-wide.

In step 3 in FIG. 4, the call control 215 initiates and creates a call control block if this call is a new request, and consults the routing service to query and determine an appropriate path to the called party.

In step 4 in FIG. 4, the routing determination function 203 invokes a path selection algorithm using the topology information in database 202 to determine an appropriate path through the network that can provide the requested service to the call. The processor time that the path selection algorithm takes is denoted as $T_r$. It not uncommon in practice that recently computed path information will be cached to reduce the computation time for subsequent path queries.

In step 5 in FIG. 4, the routing determination function 203 provides the path information to the call control 215 including the outgoing link or port that the call request should depart from the switch to reach the next hop.

In step 6 in FIG. 4, the call control 215 takes actions to determine whether or not the call request can be admitted based on local resource records and requested service information. If the call control decides to accept the call request, it either reserves the allocated resource or programs the switching fabric 220 to set up the connection. Assume that the processor time that the call control takes to perform the local decision is $T_c$.

In step 7 in FIG. 4, the call control 215 sends the request to the egress signaling 211 associated with the previously chosen outgoing link. The egress signaling allocates resources for the call (e.g., a call reference and VPI/VCI value). We denote the processor time that is spent on this work as $T_e$.

Finally, in step 8 in FIG. 4, the new call request is forwarded to the next hop on the selected path.

The call processing performance just described can be measured in two ways. First, the call processing capacity can be represented as a percentage of time the processor is doing call processing tasks. Second, the performance can be based upon the call response time or latency, which is the time between receipt of a call request and completion of all associated call processing. The major consumers of computing power in the call processing are $T_i$, $T_r$, $T_c$, and $T_e$, respectively. The goal of scalable call processing architectures is to keep an appropriate balance of computing power distribution in order to achieve scalable performance.

Figure 5:
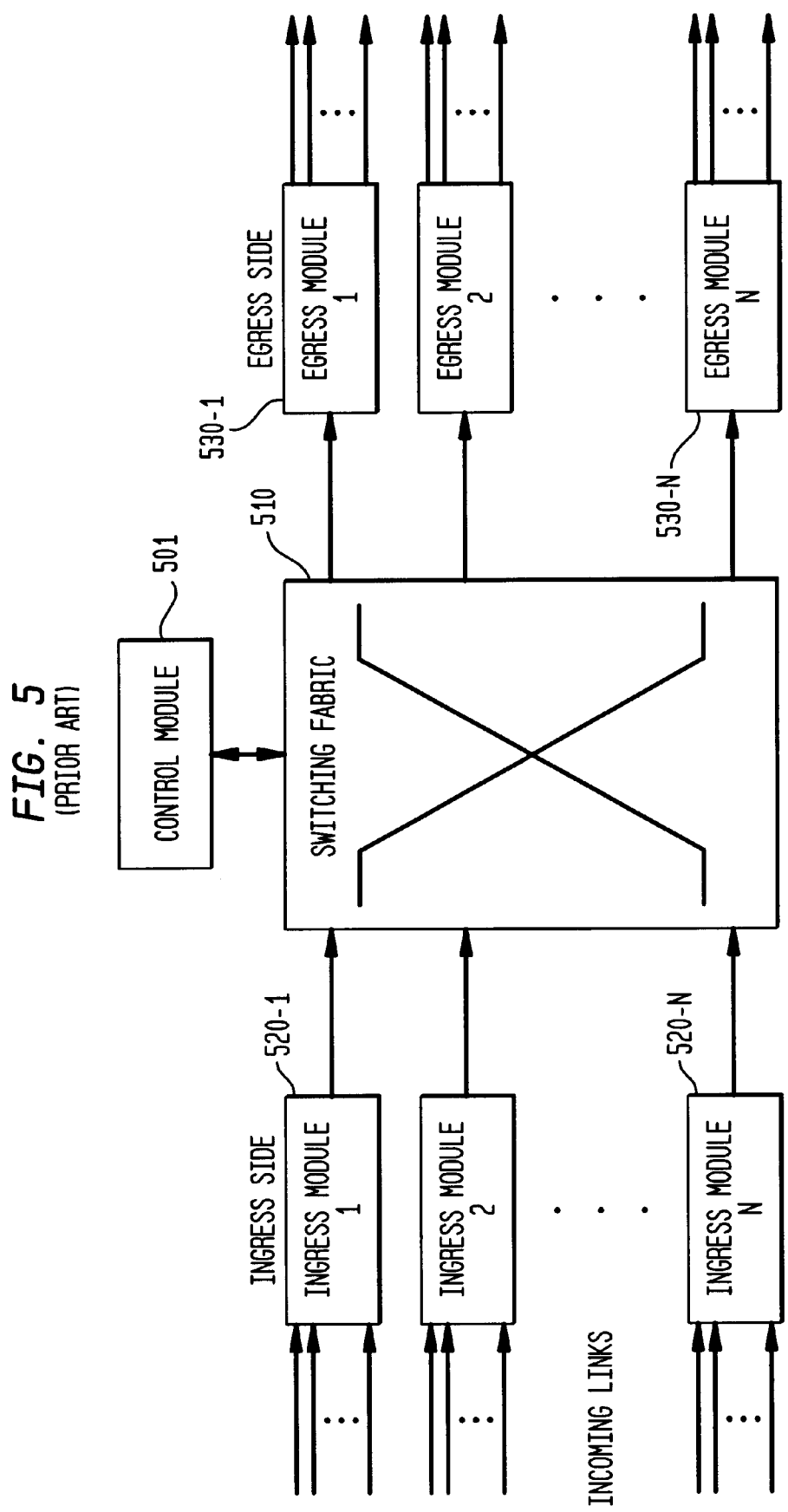
FIG. 5 illustrates the modular structure of a conventional (prior art) ATM switch.

A typical ATM switch can be viewed as a modular structure shown in FIG. 5. The switch is composed of the control module 501, the switching fabric 510 and interface modules which are not explicitly shown in FIG. 5. The interface modules are further divided into and include a plurality of ingress modules 520-1 to 520-N and a plurality of egress modules 530-1 to 530-N; it is to be noted that the actual number of ingress and egress modules need not be equal. This switch structure of FIG. 5 is generic enough to be used for the purpose of evaluating call processing functions, and illustrates a prior art approach in which call processing functions are centralized in control module 501.

Figure 6:
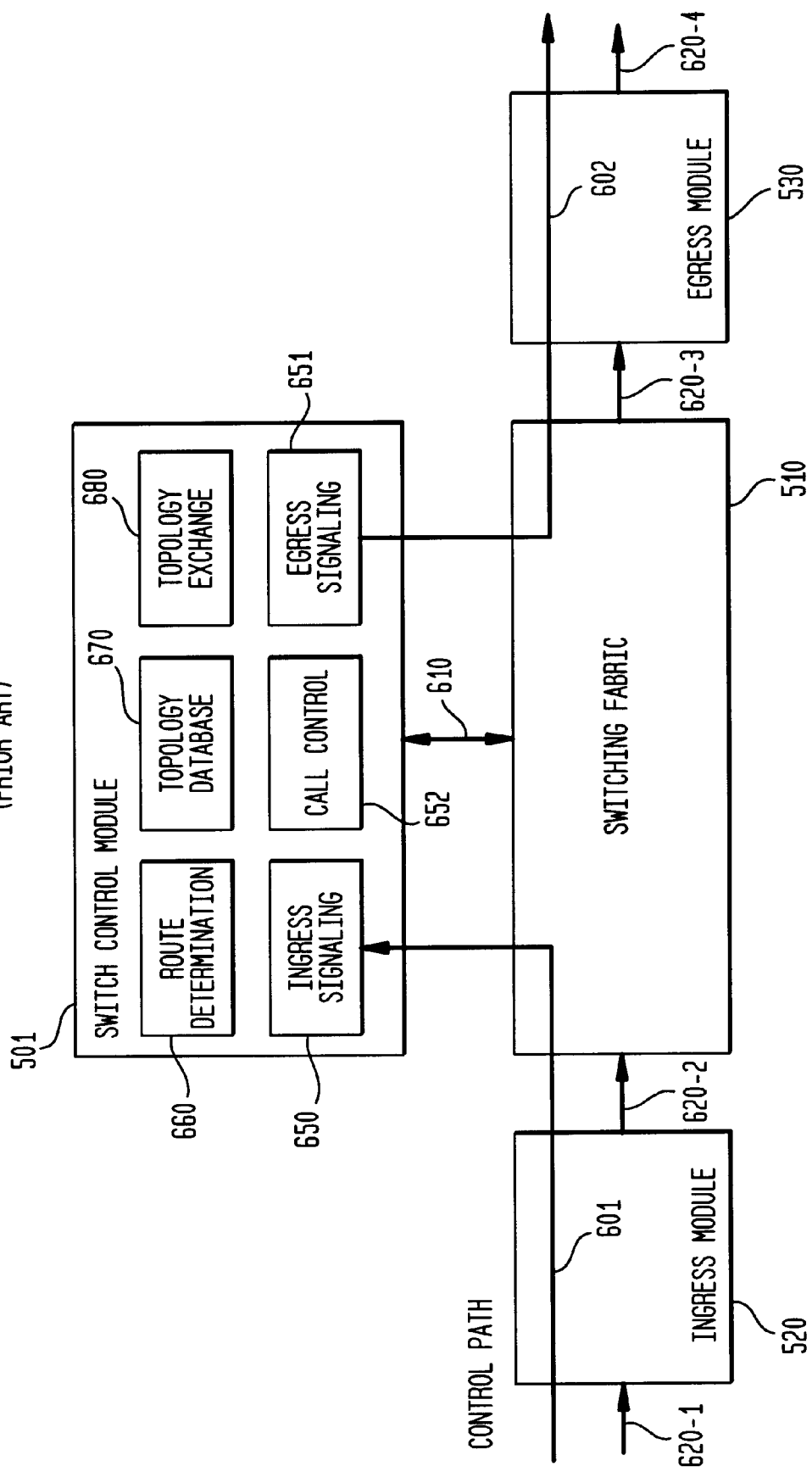
FIG. 6 illustrates typical call control functions performed in the prior art switch arrangement of FIG. 5.

In the early days of switch design, the centralized call processing architecture of FIG. 5 was largely adopted in which a single control module (module 501) was used to perform all processing tasks—handle call setup requests, update routing topology information, interpret and respond to management requests, generate management responses, manage resource allocation, program the switching fabric, and operate other services. In this architecture, which is illustrated from a functional viewpoint as shown in FIG. 6, all call requests from all network interface modules (i.e., ingress modules 520-1 to 520-N and egress modules 530-1 to 530-N of FIG. 5) must be passed to and processed by the single control module 501 residing on the switch. This is because computing power was expensive and because this centralized architecture was easy to implement. Thus, in FIG. 6, the first portion of the call control path shown by a heavy line 601, extends from the ingress modules 520 to switch control module 501, where signaling, call control and route selection are performed. The second portion of the control path 602 extends from switch control module 501 through egress modules 530, and thence to other switches in the network of which the illustrated switch is a part. The data path represented by arrow segments 620-1 to 620-4 through switching fabric 510 is selected under the control of a signal extended from module 501 to fabric 510 on control path 610.

In FIG. 6, the functions performed by switch control module 501 are illustrated as including ingress and egress signaling functions 650 and 651, respectively, a call control function 652, a route determination function 660, and a topology exchange or control function 680 performed in conjunction with a topology database 670.

Figure 7:
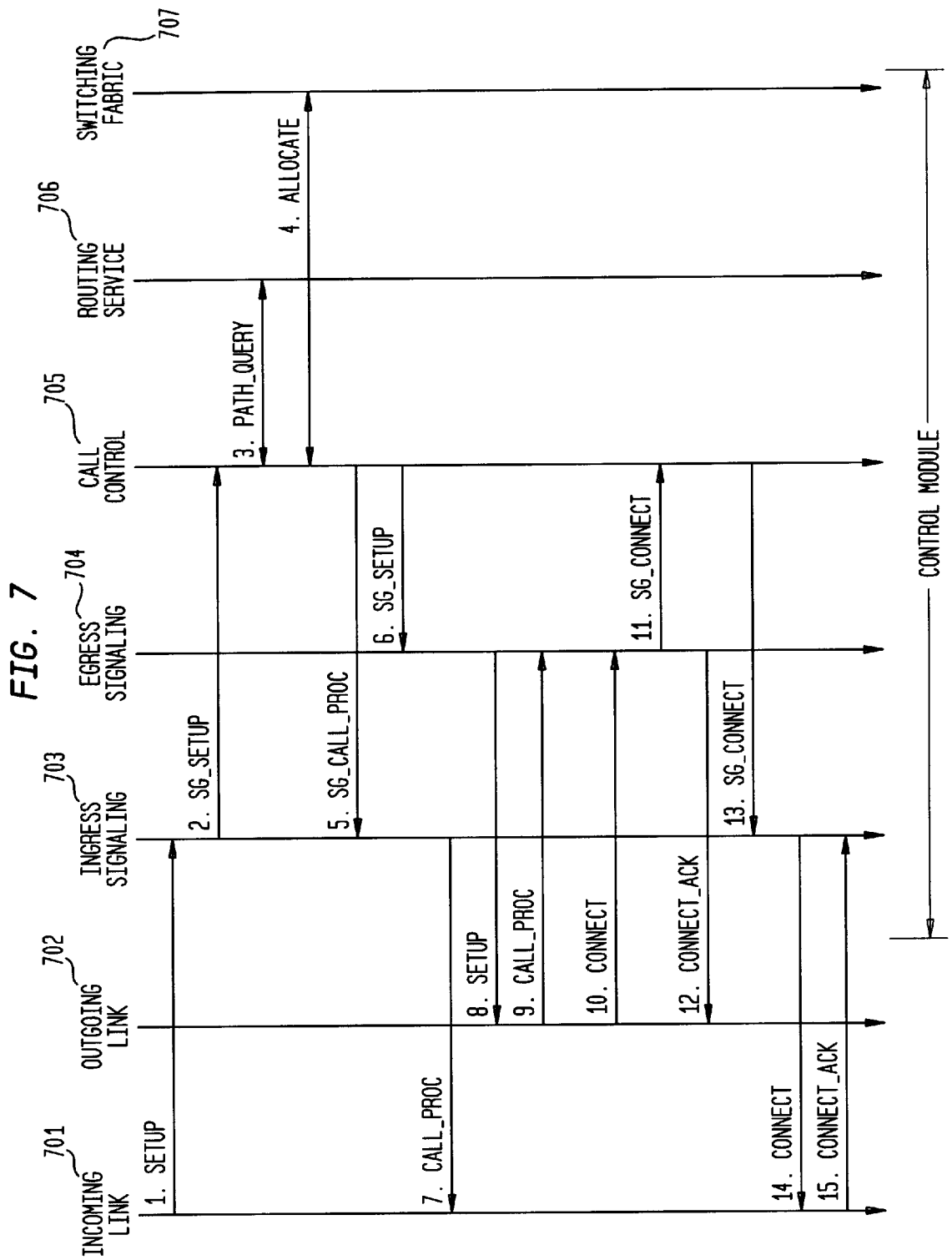
FIG. 7 is a diagram illustrating the message and event flows when calls are connected using the switch arrangement of FIG. 6.

FIG. 7 is an example of the event and message flows that pass between the various elements of the switch arrangement of FIG. 6 in order to successfully establish a call. This example illustrates the functional operation of each element of the call processing architecture. At the top of FIG. 7, the incoming link 701 and the outgoing link 702 represent the physical interfaces attached to ingress module 520 and egress module 530 of FIG. 6, respectively. Ingress signaling 703 and egress signaling 704 represent functions performed in ingress and egress units 650 and 651 of FIG. 6, respectively. Call control 705 represents the call control function 652 in FIG. 6, while the routing service represents the route determination function 660 of FIG. 6. Finally, the switching fabric 510 in FIG. 6 is labeled 707 for the purposes of illustrating message and event flows in FIG. 7.

In FIG. 7, fifteen (15) separate message and event flows are shown, and each is described below.

1. The ingress signaling stack is activated for the incoming link on which a SETUP request arrived, and processes the signaling message.
2. The call request is converted into an internal primitive SG_SETUP which is passed onto the call control 652.
3. The call control 652 initializes and creates a call record for the new request, and consults the routing service (route determination 660) which calculates an appropriate path based on the topology information (in database 670) and requested service, and returns the path information back to the call control 652.
4. The call control 652 makes a local decision whether or not the requested call can be admitted at the switch given the routing information, the current load and the requested service commitment. If the call can be admitted, the call control 652 makes a resource reservation and controls the programming of the switching hardware.

5. The call control 652 notifies the ingress signaling 650 of the call acceptance by issuing the SG_CALL_PROC primitive.
6. At this point, the call control 652 forwards the request to the egress signaling 651 which communicates with the signaling peer (not shown in FIG. 6) on the next hop of the selected path. The forwarded request may contain the path information for routing through the network.
7. Upon receipt of the primitive, the ingress signaling 650 sends a CALL_PROC message to the signaling peer at the upstream switch, which can clear the timer for the return of CALL_PROC and start another timer for CONNECT.
8. The egress signaling 651 sends a SETUP to the signaling peer at a downstream switch which continues to route the call request.
9. A CALL_PROC message is received at the egress signaling 651 which does not need to forward it to the call control 652.
10. A CONNECT message is received at the egress signaling 651, indicating the completion of the call setup from the downstream.
11. The egress signaling 651 sends the completion message to the call control 652 using the primitive SG_CONNECT.
12. The egress signaling 651 responds with a CONNECT_ACK message.
13. Upon arrival of the primitive, the connection in progress enters an active state at the call control 652, which in turn sends a similar primitive to the associated ingress signaling 650.
14. The ingress signaling 650 sends a CONNECT message to the signaling peer at the upstream switch, and is waiting for acknowledgement.
15. The ingress signaling clears its timer and the call establishment is completed.

Switches built upon this architecture can be easily implemented. Note specifically that the interface modules (i.e., the ingress modules 520 and the egress modules 530) are not involved in the call processing task. Typically, only the control module 501 requires the running of a multi-task operating system, and the interface modules can be controlled either directly by the control module 501 or simple firmware. The simplicity of interface module design can lower the cost of the switch. The low cost and simplicity make this architecture suitable for low-end products such as workgroup switches.

It is however true that the centralized call processing architecture of FIG. 6 suffers several drawbacks. This architecture does not produce scalable performance since the control module 501 becomes overloaded when the number of network interface modules are added and when the number of connections to be supported are significantly large. It is also vulnerable to the single point of failure of the control module 501. Should control module 501 fail, all call processing fails. The control module 501 is a performance bottleneck, since it is responsible for performing all call processing tasks. In particular, at least eight signaling messages need to be passed to the control module 501. As illustrated in FIG. 6, these messages must traverse the internal switching fabric 510 twice even when call requests are destined for an interface module at which they arrive. This results in performance degradation and control overheads as interface modules are added. This architecture places an ultimate limit on the scalability of the call processing power.

To overcome the deficiencies associated with the centralized call processing architecture, the present invention reduces the bottlenecks in the call processing path by adding more intelligence to each interface module. The degree of processing power distribution is determined by how the functional blocks inside the control module 501 shown in FIG. 6 are implemented in a distributed fashion. A less intelligent interface module may still depend at least partially on the assistance of the control module for its call processing task, while a more intelligent network interface module can be designed to completely off-load the call processing burden from the control module. Though there are a number of ways to achieve the distribution, we will examine three possible alternative embodiments of the present invention that can practically be implemented in the description that follows.

Figure 8:
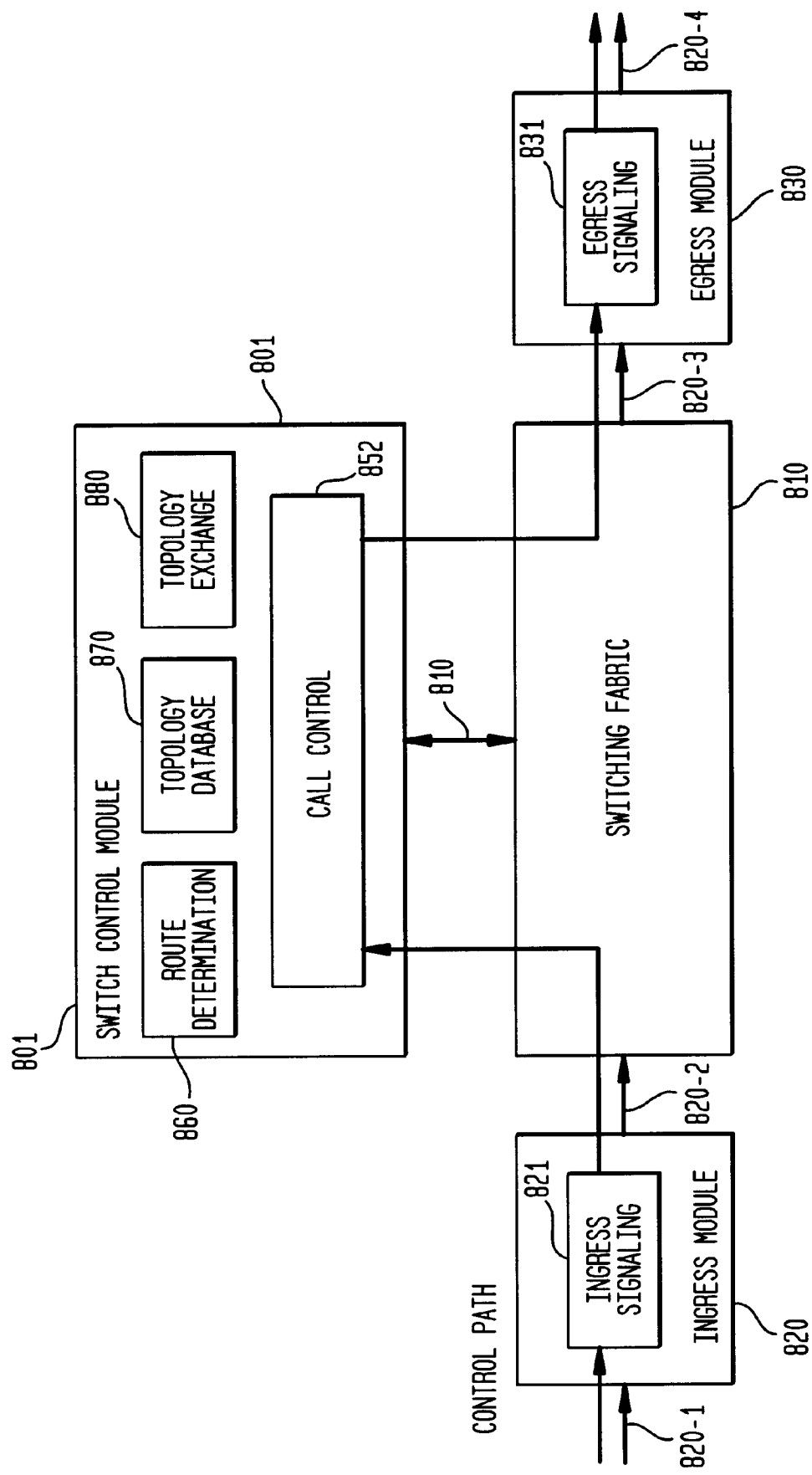
FIG. 8 illustrates a first embodiment of a switch arranged in accordance with the present invention in which signaling processing functions are distributed to each interface module rather than centralized in the switch control module.

In the architecture shown in FIG. 8, signaling processing is distributed to each interface module (i.e., ingress module 820 and egress module 830) which has its own dedicated processor possibly running a multitask kernel. As its name implies, each interface module in this architecture terminates signaling stacks and participates in the call control procedure. The control module 801 in FIG. 8 no longer deals with the operation of signaling stacks. The processing of signaling messages has widely been recognized as the most time consuming task, and by off-loading this task to the interface modules (i.e., ingress module 820 and egress module 830), this architecture can achieve higher performance and scalability. The call processing latency is expected to improve due to the concurrence of signaling processing.

In FIG. 8, call control and route selection functions are performed in a manner similar to that already described in FIG. 6. For those purposes, the arrangement of FIG. 8 includes a switch control module which includes a call control 852, a route determination module 860 and a topology exchange module 880 that updates/uses topology information stored in database 870.

Figure 9:
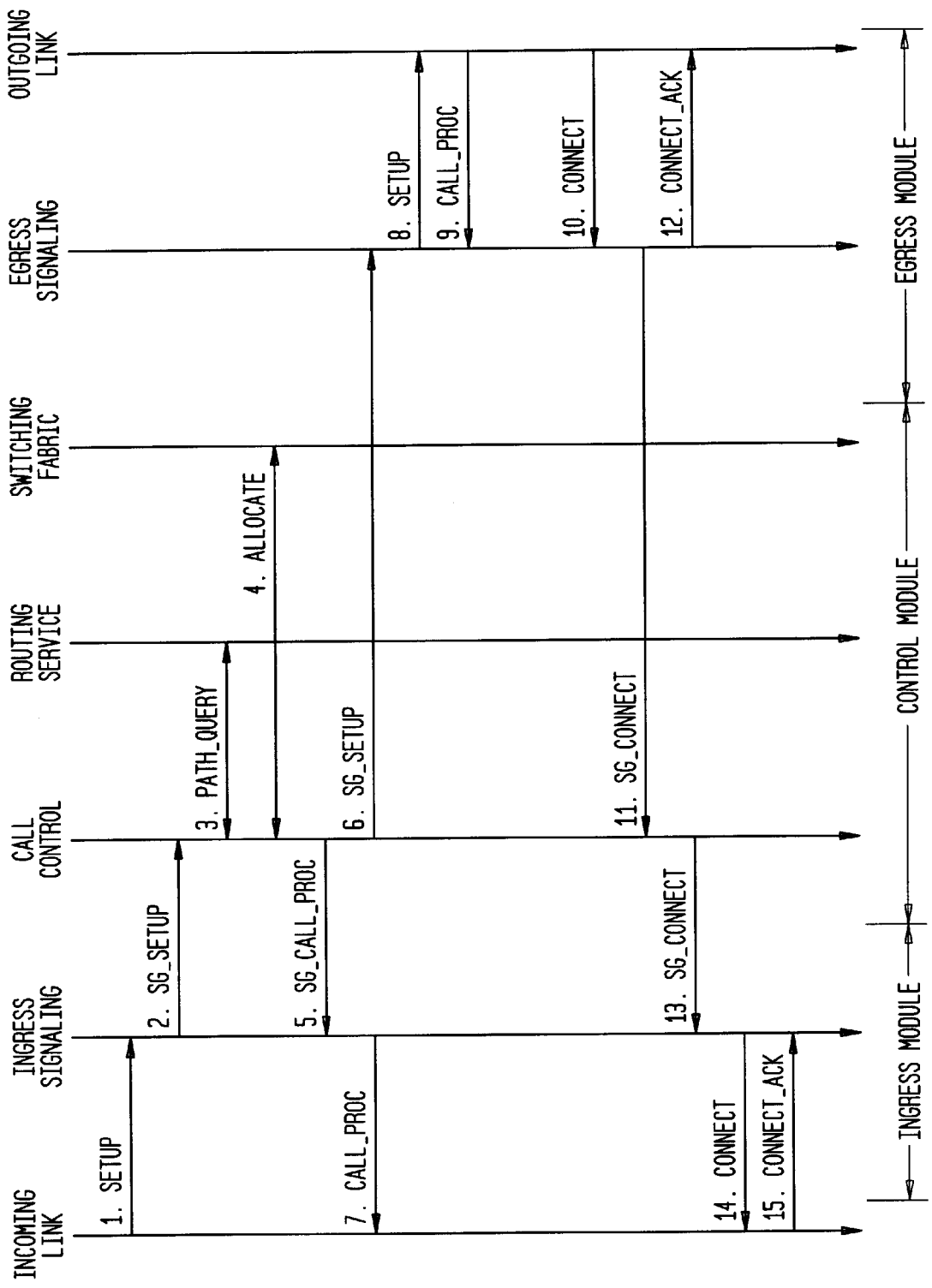
FIG. 9 is a diagram illustrating the message and event flows when calls are connected using the switch arrangement of FIG. 8.

For comparison, a typical procedure for call establishment using the architecture and arrangement of FIG. 8, is illustrated in FIG. 9. The detail of the event/message flows is self-explanatory. It should be noticed that not all signaling messages need to be passed onto the switch control module 801. Rather, those messages with local significance are terminated on the interface module. For instance, in step 9 in FIG. 9, the CALL_PROC message is terminated on the egress signaling module 831. A similar example is the termination of the CONNECT_ACK on the ingress signaling module 821 in step 15.

Each interface module simply converts the signaling primitives from the signaling stack into the internal control messages. However, the control module 801 is still responsible for the call control task shown in call control 852 in addition to the normal routing (performed in route determination module 860) and overall system operation, management and administration. Like the centralized call processing architecture of FIG. 6, all signaling messages with global significance such as SETUP, CONNECT, RELEASE have to be passed to the control module 801, even when they are destined for the local switch or on the same interface module. In other words, these messages must traverse the switching system twice. This still generates a significant amount of traffic that must be forwarded to the control module. While the arrangement of FIG. 8 represents an improvement over the prior art, the control module 801 continues to be the single point of failure in call processing.

Figure 10:
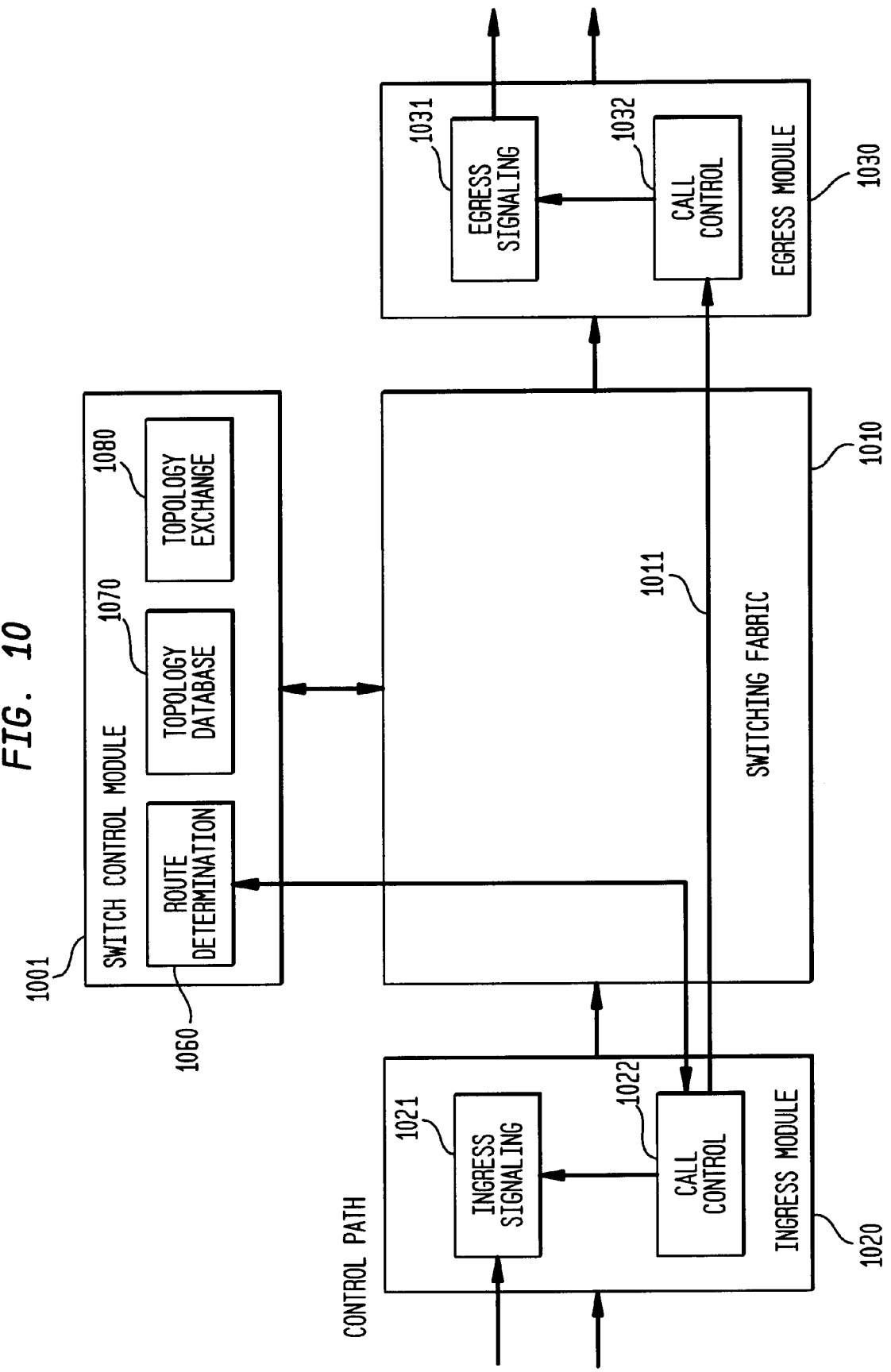
FIG. 10 illustrates a second embodiment of a switch arranged in accordance with the present invention in which both signaling processing functions and call control functions are distributed to each interface module rather than centralized in the switch control module.

The switch architecture shown in FIG. 10 is another embodiment of the present invention that uses the just described distributed signaling call processing architecture. This embodiment also includes a distributed implementation of call control to further improve the overall call processing performance of the switch. Specifically, the ingress module 1020 in FIG. 10 includes both ingress signaling 1021 and call control 1022 functions, while egress module 1030 includes both egress signaling 1031 and call control 1032 functions. This arrangement allows the direct forwarding path of signaling messages from the ingress module 1020 to the egress module 1030 via the link 1011, eliminating the performance bottleneck at the control module 1001. This architecture also allows the flexibility to implement a variety of different (including proprietary) internal control strategies. A minimal interface module will simply query routing information for all call requests from the control module 1001. A more intelligent interface module will respond to a call request destined at the switch, and only consult the control module 1001 whenever the destination is on another switch in the network.

The arrangement illustrated in FIG. 10 is based on the observation that most of call requests do not consult routing protocols. In general, any call request destined for an UNI interface at the switch can be routed without routing protocol. In P-NNI terminology, the switch is configured by the network management station with a network prefix to identify all of end systems attached to it. Each end system on an UNI interface attached to the switch will register with the switch during the address registration process using the ILMI (integrated local management interface) protocol. The ATM address contains two parts. The first part is the network prefix, and the second part is a host identifier. The host identifier has the direct mapping to a port on the switch. This information will not change during normal operation, and can be replicated on the call control at each interface module. By examining the network prefix, the call control on an interface module can immediately determine whether the proceeding call request is destined for the switch. If so, the call control can further map the host portion of the called party address to the port number on the switch so that the egress interface module can be decided.

In case that the destination is at an NNI interface, the route determination module 1060 is only required when this switch is either an entry node of a peer group or an originating switch, where the routing path information must be created in the form of designated transit list (DTL). For each NNI interface connected to the switch, the associated network address prefix is known during the hello message exchange of P-NNI protocol. Again, this information can be replicated on each interface module running the P-NNI signaling protocol stack. In the case that the switch is not an entry node, the ingress interface module can determine the egress interface module by simply examining the network address prefix of the next node on the existing DTL carried in the SETUP message. Then this information will be mapped to the port number on the switch. This case demonstrates again that P-NNI routing is not required.

The previous discussion suggests an implementation of the scalable call processing architecture of the present invention in which local routing information is replicated on the call control 1022, 1032 at each interface module. Whenever an interface module comes into operation or the switching environment changes, this local routing information is updated from the control module 1001. Each interface module is able to make local decisions based on the called party address information, but contacts the routing protocol on the control module 1001 only when necessary. Advantageously, in this embodiment, the control module 1001 is only responsible for those tasks that are not performed by interface modules, including computation-intensive P-NNI routing protocol.

For connections destined for the UNI interfaces on the same network interface module (intra-module traffic), call processing can be done locally without any assistance from the control module 1001. This capability will make the architecture highly scalable. As a result, the communication between an interface module and the control module 1001 can also be simplified as opposed the previous cases where entire signaling messages must be passed to the control module. The only reason for an ingress module to contact the control module is to obtain global routing information (i.e., generation of a new DTL). The signaling information elements that are necessary to make the routing decision only need to be passed to the route determination module 1060 in the control module 1001. Examples of these information elements include the traffic contract, QoS parameters, and the calling party and called party addresses. This reduction of information necessary to pass between the interface module and the control module 1001 leads to the significant improvement of performance at the control module. From the perspective of call setup, the control module plays a role of a P-NNI router. The call control function is completely distributed to interface modules.

Figure 11:
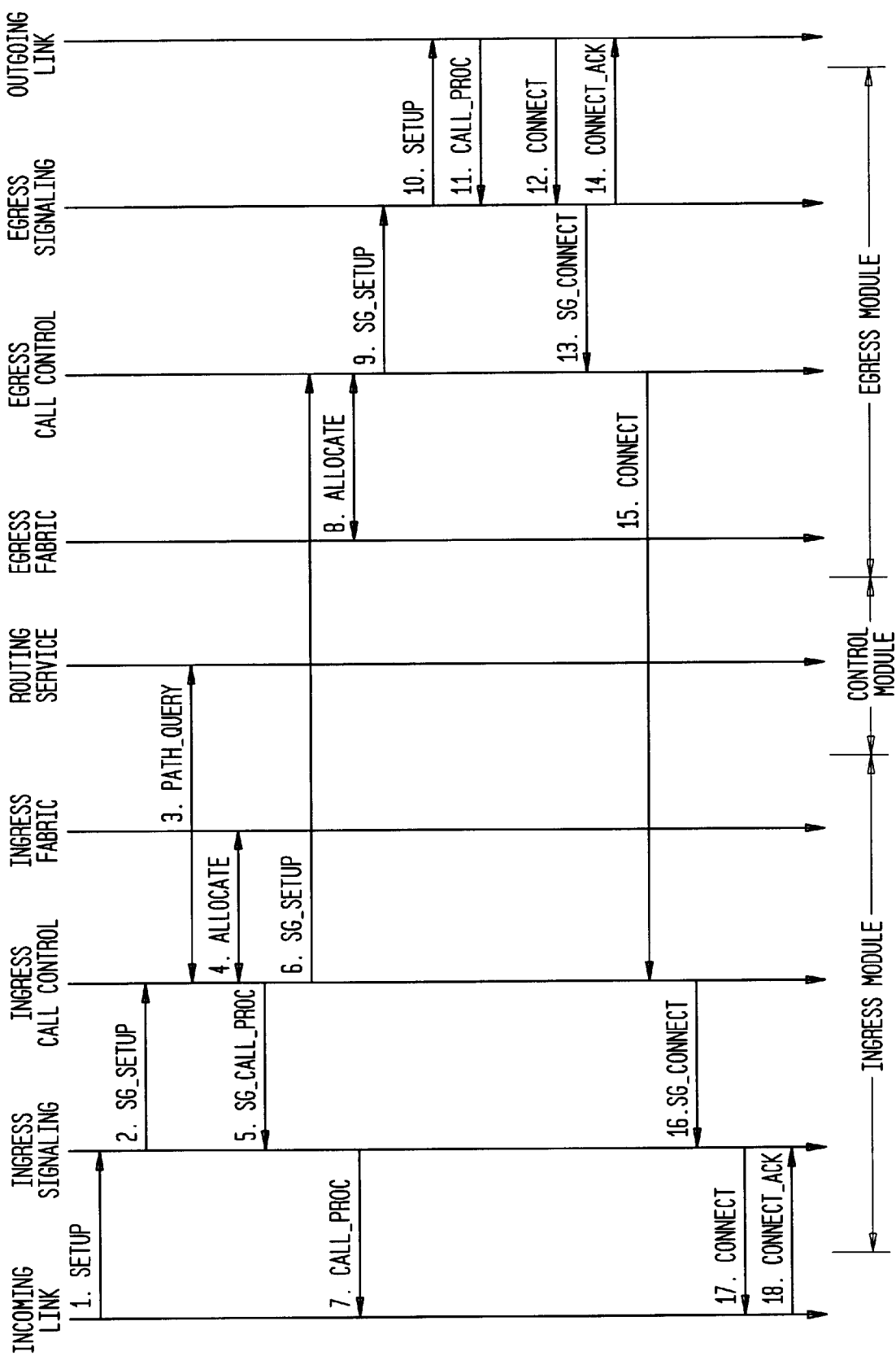
FIG. 11 is a diagram illustrating the message and event flows when calls are connected using the switch arrangement of FIG. 10.

The message and event flows when calls are connected using the switch arrangement of FIG. 10, are shown in FIG. 11. Note that if the call request is destined for a UNI, the control module 1001 is not involved in the call setup. This situation is not shown in the FIG. 11.

The performance improvement of the architecture of FIG. 10 comes at a cost. A distributed call control is much more difficult to be implemented than the distributed signaling implementation of FIG. 8. It requires a complex coordination of call control components in the system. In addition, since the control module may continue to maintain the system resource information, the interface module is required to report local decisions to the control module with regard to the local resource information. This housekeeping work may need to be performed on a periodic or an event-driven basis.

A further performance improvement can be achieved in accordance with the third embodiment of the present invention, by distributing (in addition to the signaling and call control functions) the function of path selection to each interface module. In this architecture, shown in FIG. 12, the control module 1201 is only responsible for routing protocol topology exchange, and at each topology update, it will replicate the topology data at the topology database 1270 which each interface module maintains. The complex task of calculating a path for a given call request will be performed by the route determination component 1260 locally.

Figure 12:
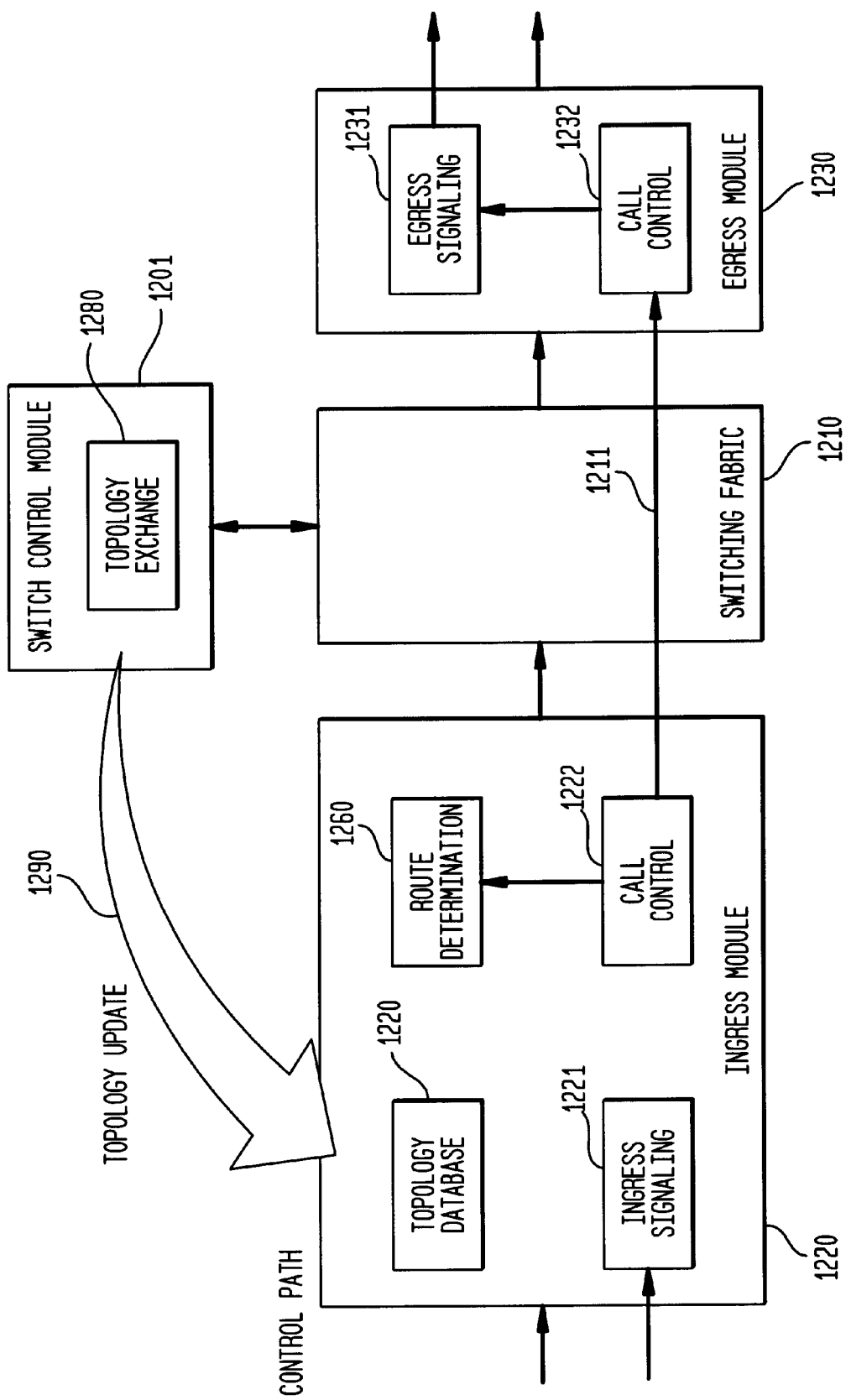
FIG. 12 illustrates a third embodiment of a switch arranged in accordance with the present invention in which signaling processing, call control and route selection functions are all distributed to each interface module rather than centralized in the switch control module.

In the arrangement of FIG. 12, ingress module 1220 includes not only ingress signaling module 1221 and call control module 1222, but also route determination module 1260, which works in conjunction with topology database 1270. In egress module 1230, only call control and signaling modules 1232 and 1231 need be provided, because the route selection functions performed in the interface module of each switch are available on a duplex or two-way basis.

In the arrangement of FIG. 12, a topology update, over the path shown by arrow 1290, will typically take place periodically (e.g., every 30 seconds) or on an event-driven basis whenever a significant topology change has occurred. The amount of traffic this update generates is not significant based on our analysis of the size of PNNI topology database, thanks to the technique of topology aggregation to make the routing protocol scale to a large network.

Figure 13:
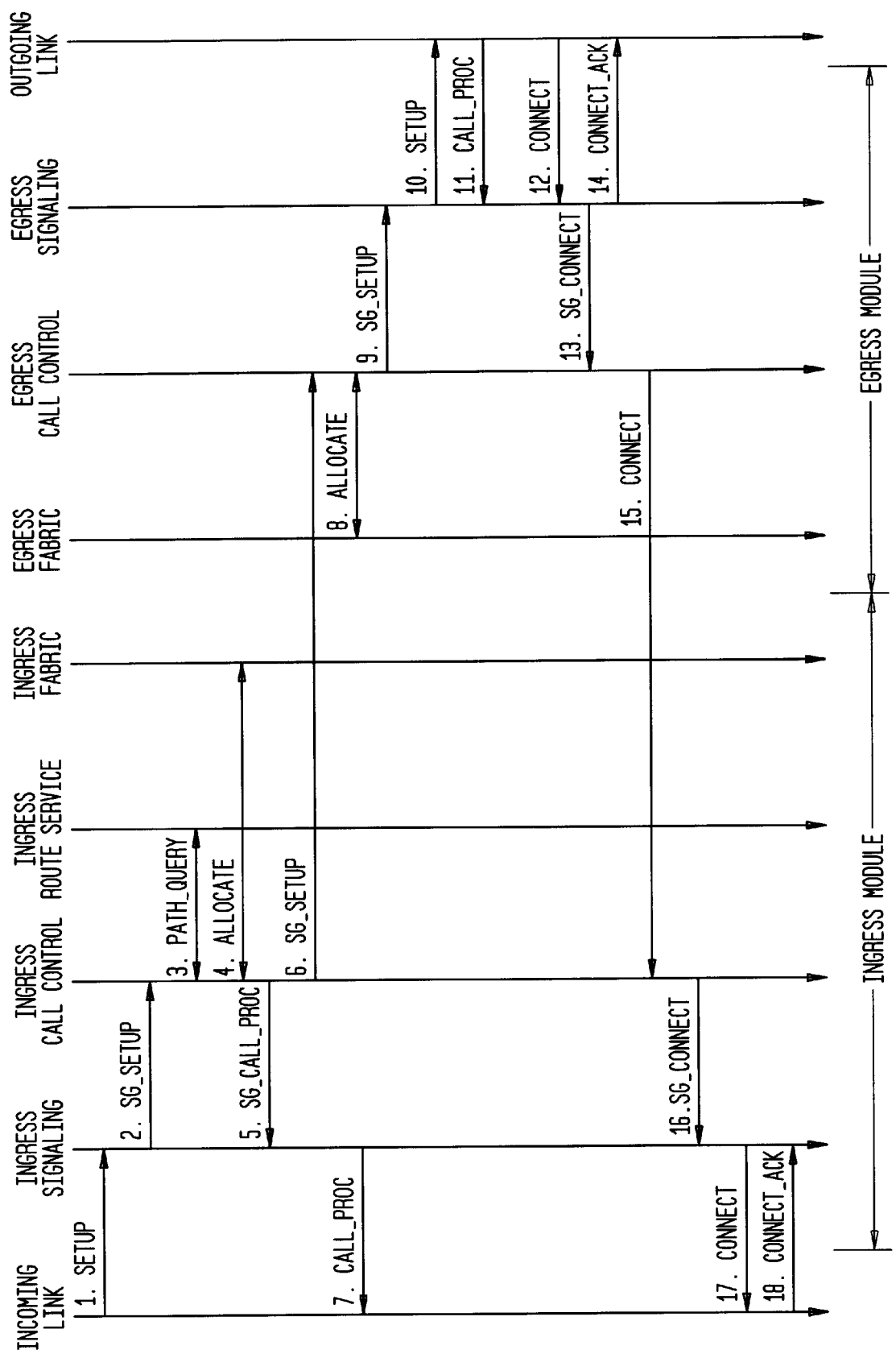
FIG. 13 is a diagram illustrating the message and event flows when calls are connected using the switch arrangement of FIG. 12.

FIG. 13 is a diagram illustrating the message and event flows when calls are connected using the switch arrangement of FIG. 12; Advantageously, it is clear that in this arrangement, the control module 1201 is no longer in the control path.

Figure 14B:
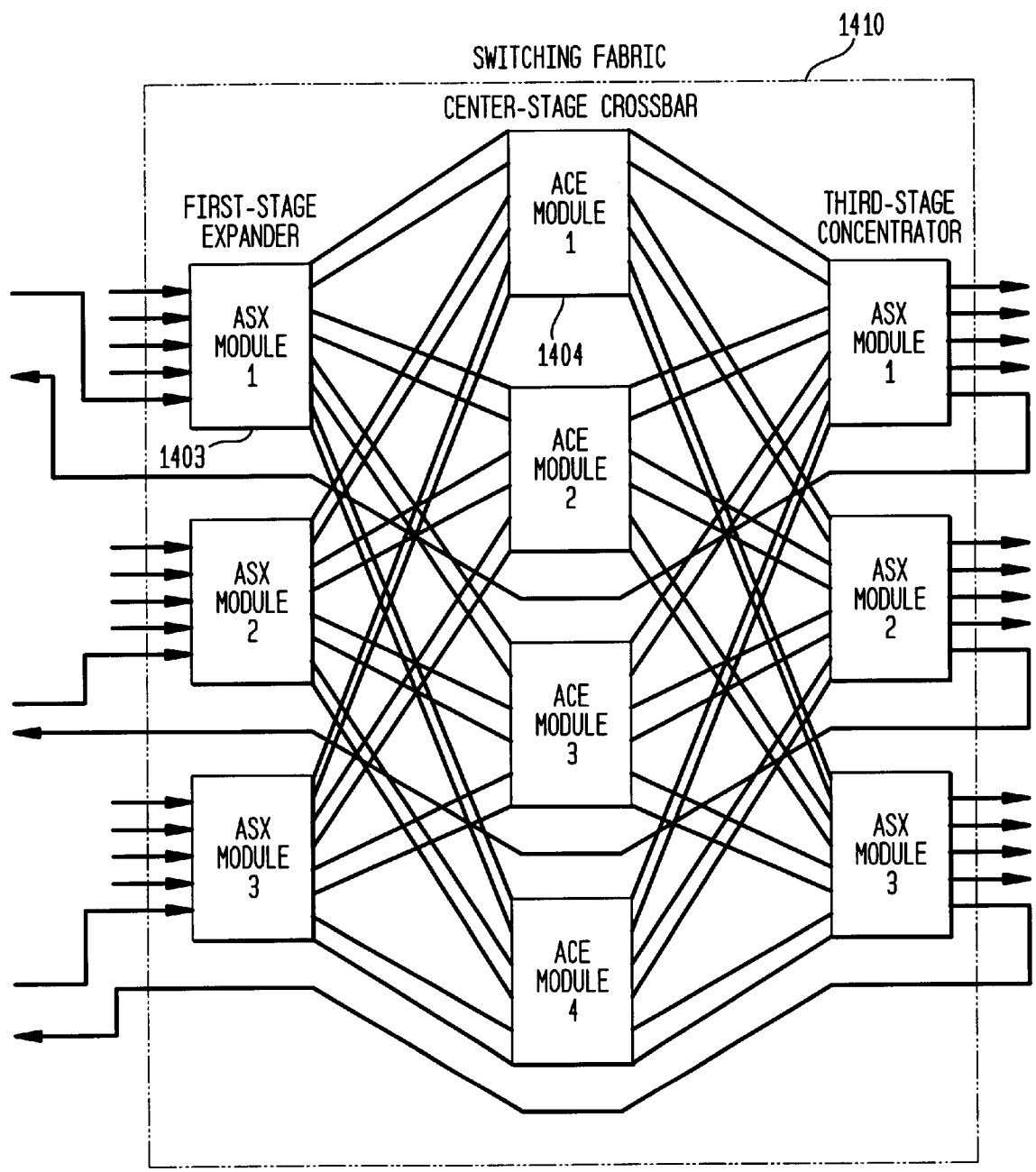
FIG. 14 is a more detailed example of a specific implementation of the present invention.

A practical example of designing and implementing the call processing architecture in accordance with the present invention in a commercial ATM switch will be described in connection with a 15-by-15 switch with switching capacity of 10 gigabit per second that is intended to be an edge or enterprise switch. It was originally decided that the switch hardware would use the four-device ATLANTA™ chipset available from Lucent. The devices in each chipset are described in the following publications available from Lucent Technologies: ATM Layer UNI Manager (ALM), shown as 1401 in FIG. 14, is described in document LUC4AAU01, 1997; ATM Buffer Manager (ABM), shown as 1402 in FIG. 14, is described in document LUC4AB01, 1997; ATM Switch Element (ASX), shown as 1403 in FIG. 14 is described in document LUC4AS01, 1997; and ATM Crossbar Element (ACE) shown as 1404 in FIG. 14, is described in document LUC4AC01, 1997). In addition to the chipset, the explicit rate manager (ERM) device 1405 was designed to support the available bit rate (ABR) traffic control. The switch consists of the switching fabric module 1410, the interface modules 1420-1 through 1420-N, and the control module (not shown in the figure). The control module is similar to the interface module except that it does not have the ERM device.

The initial goal for this switch development was to support 150 calls per second based on the marketing requirement, but the long-term objective was to achieve 1,000 calls per second in the future releases of the product. The first call processing architecture was fully centralized, in accordance with the prior art, whereby all the signaling, call control and routing was performed in a centralized manner in the control module. The control module could have either a single or multiple processors. The hardware decision was made to select the PowerPC 603 family of microprocessors. The performance expectation for this architecture was on the order of 50 calls per second or less assuming one high-end processor of 603e was used on the control module. Further performance improvement could be achieved if multiprocessor architecture was implemented on the control module. A simple analysis indicated that at least two 603e processors would be required to meet the requirement of 150 calls per second. However, the hardware density of the control module placed a limit on the number of processors that could physically fit. More importantly, the architecture could not scale to meet the future requirements. The control module would be designed for a fully loaded system, and a customer would have to purchase this expensive module independent of the number of interface modules he would like to configure for the switch. The fact that the control module needs to be re-designed each time the call processing objective is increased makes this particular centralized approach difficult and costly to upgrade.

The problems experienced with the conventional design could, however, be overcome by using one of the scalable, distributed call processing architectures discussed above. In a switch architecture in accordance with the present invention, a SAR (segmentation and reassembly) device 1406 was added to the interface module as shown in FIG. 14, to provide signaling processing capability. In addition, a microprocessor 1407 was added, to handle other signaling and co-processing tasks. The estimated incremental COGS (cost of goods) was roughly 20% to 30% for the device and glue logic. This architecture, when used to provide the distributed signaling functionality described above, yielded a factor of three performance improvement over the centralized approach, and provided a call processing performance of roughly 150 calls per second, which was sufficient to meet the initial objective. This arrangement also allowed for incremental improvement by upgrading the software to a more distributed architecture, which in the future could also accommodate distributed call control and distributed routing, since this could be accomplished with only software upgrades, and there would be no need for additional hardware. This strategy was justified given the risk and development cost to implement distributed call control or routing architecture. On the other hand, the distribution of signaling tasks was relatively easy to be implemented.

Figure 15:
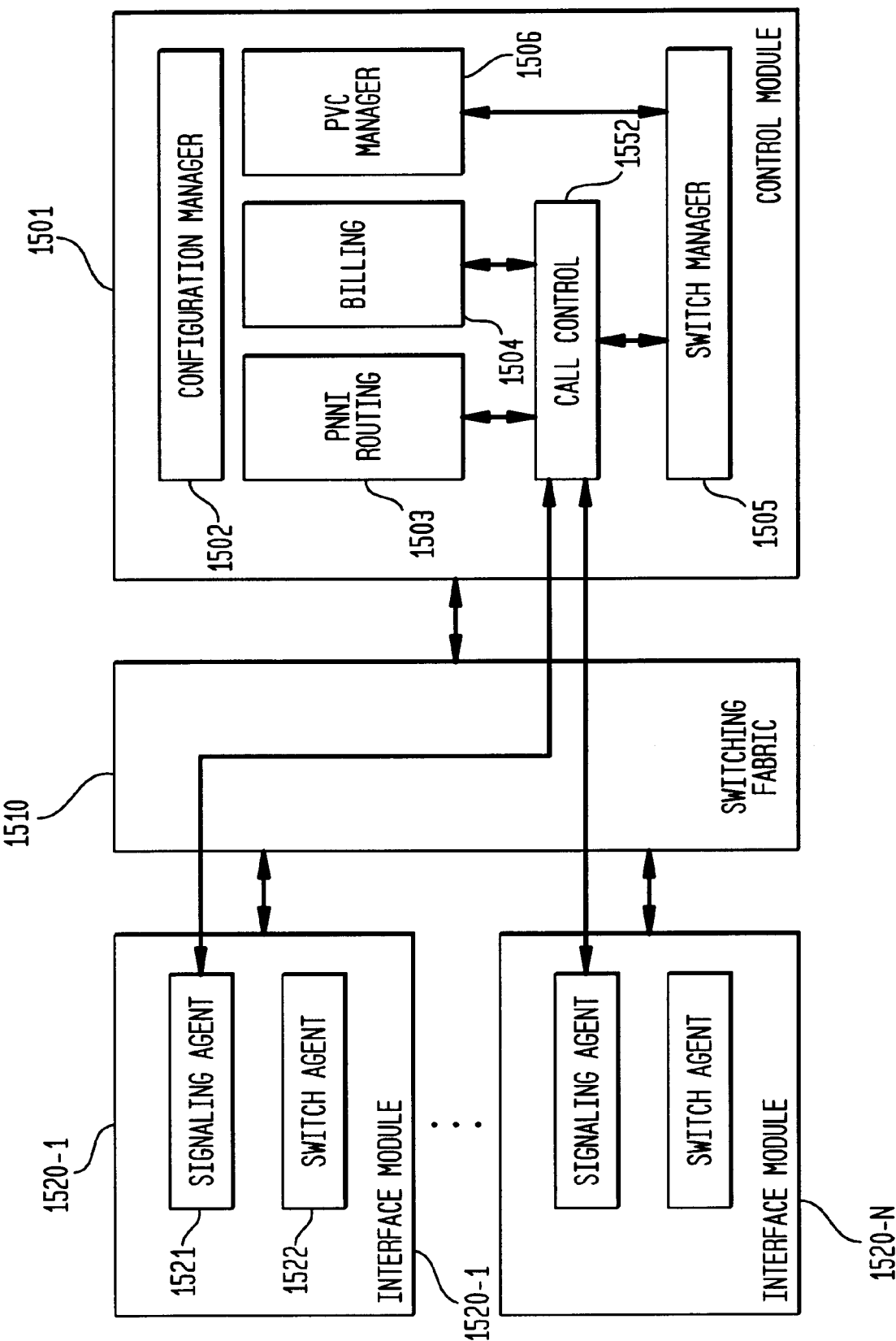
FIG. 15 is a functional block diagram illustrating the switch call processing architecture in the implementation example of FIG. 14.

The major components of the software architecture on both the control module and an interface module are illustrated in FIG. 15. The switch includes a switching fabric 1510 operated under the control of a switch control module 1501. Input and output signals are received in the switch fabric 1510 via a plurality of interface modules 1520-1 to 1520-N, each of which is arranged, as discussed below, to perform signaling control functions in a distributed manner. Each interface module 1520 operates in a real time operating system environment, and the communication between the control module 1501 and an interface module 1520 takes place via an interprocess communication mechanism.

On an interface module 1520, the signaling agent 1521 is responsible for implementing the signaling stack for establishment and termination of switched virtual connections. On the control module 1501, the configuration manager 1502 provides the system administration and provisioning and network management. The call control 1552 is responsible for creating and initializing signaling stacks on interface modules 1520, and provides the overall coordination for connections active in the switch. This coordination requires the call control 1552 provide the internal control interfaces with the signaling agent 1521, the PNNI routing 1503, the billing 1504, and the switch manager 1505. The PVC (permanent virtual connection) manager 1506 provides the service of provisioning permanent virtual connections. The switch manager 1505 performs traffic management and mechanisms for programming the switching fabric 1510, and coordinates with the switch agent 1522 on the interface module 1520 to setup/teardown connections in the switching hardware.

Based upon the foregoing description, it is seen that the present invention can satisfy the needs for scalable performance, high availability, and flexible configuration. The three different architectures described in conjunction with this invention distribute the call processing functions to each network interface module at a varying degree. The performance and scalability of these architectures are superior to the centralized architecture used in the prior art. With the present invention, call processing performance can be improved by several orders of magnitude by off-loading the call processing burden from the central control module.

The following table compares the architectures discussed above. The practical challenge for the choice of call processing architecture for a particular application is to find an appropriate balance in achieving defined performance objectives.

| Attribute | Centralized Architecture | Distributed Signaling Architecture | Distributed Call Control Architecture | Distributed Routing Architecture |
|---|---|---|---|---|
| Scalability | Low | Medium | High | Very high |
| Performance | <100 calls/sec | 150–400 calls/sec | 500–1000 calls/sec | >1,000 calls/sec |
| Flexibility | Low | Medium | High | Very high |
| Implementation Complexity | Low (single processor system) | Low-Moderate (multi-processor system) | Moderate (multi-processor system) | High (multi-processor system) |
| Reliability | Single point of failure | Single point of failure | Reliable | Highly reliable with fault-tolerance |
| Hardware Cost | Low (Low-cost interface modules but high-cost control module) | Moderate | Moderate | Very high (High-cost interface modules but low-cost control module) |
| Applications | Justifiable for low-end switches (e.g., workgroup switches) | Suitable for medium-size switches (e.g., campus/enterprise switches) | Applicable to switches to be used as enterprise/edge devices | Very good candidates for high-end switches such as edge or core switches in wide area networks |

Persons skilled in the art will appreciate that various changes and modification can be made to the present invention without departing from its spirit or limiting its scope. Accordingly the invention is to be limited only in accordance with the following claims.

What is claimed is:

1. A connection oriented switch with distributed signaling, said switch comprising:
    a switching fabric,
    a switch control module for providing (a) coordination of call processing tasks performed in said switch and (b) path selection for calls routed through said switch, said switch control module including a call control unit, a router determination unit under the control of said call control unit, and a topology database updated by a topology exchange, and
    a plurality of interface modules, each including a signaling unit cooperative with said call control unit for (a) the decentralizing of at least one said call processing task from said switch control module, (b) directing said incoming calls from a source to said switching fabric and from said switching fabric toward a destination, (c) processing the signaling messages associated with said incoming calls in accordance with the signaling protocol stack terminated at said signaling unit, and (d) directing internal control messages associated with incoming calls to said switch control module, said internal control messages containing only necessary information used for call set up and path selection.

2. A connection oriented switch with distributed call control, said switch comprising:
    a switching fabric,
    a switch control module for providing path selection for calls routed through said switch, and
    a plurality of interface modules, each including a call control unit, said interface modules arranged to (a) decentralize at least one call processing task from said switch control module, (b) direct said incoming calls from a source to said switching fabric and from said switching fabric toward a destination, (c) process the signaling messages associated with said incoming calls in accordance with the signaling protocol stack terminated at said interface modules, (d) coordinate among said interface modules, call control tasks performed in said switch, and (e) direct internal control messages associated with incoming calls directly to said call control unit in said outgoing interface modules, said internal control messages containing signaling and control primitives.

3. The invention defined in claim 2 wherein said interface modules are further arranged to query said switch control module to obtain information used to route calls through said switch.

4. The invention defined in claim 2 wherein said switch is an ATM switch and wherein said path selection is based upon the PNNI routing protocol.

5. A connection oriented switch with distributed routing, said switch comprising:
    a switching fabric,
    a switch control module containing a topology exchange unit that exchanges routing information with other switches in the network of which said connection oriented switch is a part,
    a plurality of interface modules, each including a route determination unit, said interface modules arranged to (a) decentralize at least one call processing task from said switch control module, (b) direct said incoming calls from a source to said switching fabric and from said switching fabric toward a destination, (c) process the signaling messages associated with said incoming calls in accordance with the signaling stack protocol used by said switch, (d) coordinate among said interface modules, call control tasks performed in said switch, and (e) direct internal control messages associated with incoming calls to said call control unit in said outgoing interface modules, said internal control messages containing signaling and control primitives, and (f) provide path selection for calls routed through said switch in accordance with information contained in a topology database unit within said interface module, wherein topology information in said topology database is updated with information from said topology exchange unit located at said switch control module.

6. The invention defined in claim 5, wherein said switch is an ATM switch and wherein said topology database is constructed from information in said topology exchange unit in a format specified in the PNNI routing protocol.

7. The invention defined in claim 5 wherein said updates occur on a periodic and/or on an event-driven basis.

* * * * *